United States Patent
Jang et al.

(10) Patent No.: US 12,287,549 B2
(45) Date of Patent: Apr. 29, 2025

(54) DISPLAY APPARATUS

(71) Applicant: SAMSUNG ELECTRONICS CO., LTD., Suwon-si (KR)

(72) Inventors: Hyojae Jang, Suwon-si (KR); Sungho Kim, Suwon-si (KR); Mira Jo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/750,183

(22) Filed: Jun. 21, 2024

(65) Prior Publication Data

US 2025/0068017 A1  Feb. 27, 2025

Related U.S. Application Data

(63) Continuation of application No. PCT/KR2024/007673, filed on Jun. 5, 2024.

(30) Foreign Application Priority Data

Aug. 24, 2023 (KR) .................. 10-2023-0111596

(51) Int. Cl.
  *G02F 1/1362* (2006.01)
  *G02F 1/1333* (2006.01)
  (Continued)

(52) U.S. Cl.
  CPC .. *G02F 1/136204* (2013.01); *G02F 1/133308* (2013.01); *G02F 1/133528* (2013.01); *G02F 1/1368* (2013.01); *G02F 2201/503* (2013.01)

(58) Field of Classification Search
  None
  See application file for complete search history.

(56) References Cited

U.S. PATENT DOCUMENTS 8,724,048 B2  5/2014  Nozaki
9,785,027 B2  10/2017  Hirata et al.
(Continued)

FOREIGN PATENT DOCUMENTS

JP  2010-164946 A  7/2010
JP  2017-097040 A  6/2017
(Continued)

OTHER PUBLICATIONS

International Search Report (PCT/ISA/210) issued on Sep. 24, 2024 by the International Searching Authority in International Patent Application No. PCT/KR2024/007673.
(Continued)

*Primary Examiner* — Phu Vu
(74) *Attorney, Agent, or Firm* — Sughrue Mion, PLLC

(57) ABSTRACT

A display apparatus is provided and includes a display panel including a first border and a second border, and a decorative bezel that covers the first border. The display panel further includes: a first substrate, a second substrate including a first side, on which the first substrate is disposed, and a second side opposite to the first side, an electrode layer on the second side of the second substrate; a ground wire between the first substrate and the second substrate, the ground wire configured to connect to a ground; and a conductive silicon that is on the second border and electrically connects the electrode layer and the ground wire.

15 Claims, 5 Drawing Sheets

(51) Int. Cl.
      *G02F 1/1335*     (2006.01)
      *G02F 1/1368*     (2006.01)

(56) References Cited

U.S. PATENT DOCUMENTS

| | | | |
|---|---|---|---|
| 2007/0170858 A1* | 7/2007 | Cho | G02F 1/133604 |
| | | | 313/512 |
| 2010/0079692 A1* | 4/2010 | Hwang | G02F 1/1339 |
| | | | 349/40 |
| 2011/0285640 A1* | 11/2011 | Park | G02F 1/13338 |
| | | | 349/122 |
| 2019/0064615 A1* | 2/2019 | Lim | G06F 3/0412 |
| 2021/0302777 A1* | 9/2021 | Fujikawa | G02F 1/133562 |

FOREIGN PATENT DOCUMENTS

| | | |
|---|---|---|
| KR | 2001-0060825 A | 7/2001 |
| KR | 10-0839834 B1 | 6/2008 |
| KR | 10-1336541 B1 | 12/2013 |
| KR | 10-2014-0027612 A | 3/2014 |
| KR | 10-1728488 B1 | 4/2017 |
| KR | 10-2017-0075434 A | 7/2017 |
| KR | 10-1957839 B1 | 3/2019 |
| KR | 10-2021-0008739 A | 1/2021 |
| KR | 10-2521759 B1 | 4/2023 |

OTHER PUBLICATIONS

Written Opinion (PCT/ISA/237) issued on Sep. 24, 2024 by the International Searching Authority in International Patent Application No. PCT/KR2024/007673.

* cited by examiner

DISPLAY APPARATUS

CROSS-REFERENCE TO RELATED APPLICATIONS

This application is a bypass continuation of International Application No. PCT/KR2024/007673, filed on Jun. 5, 2024, which claims priority to Korean Application No. 10-2023-0111596, filed on Aug. 24, 2023, in the Korean Intellectual Property Office, the entire contents of which are incorporated herein by reference in their entireties.

BACKGROUND

1. Field

The disclosure relates to a display apparatus including a display panel.

2. Brief Description of Related Art

In general, a display device displays visual and three-dimensional (3D) image information. Display devices may include, in addition to televisions (TVs) and monitors, other devices implemented in various forms, such as portable multimedia devices (e.g., digital broadcasting terminals, personal digital assistants (PDAs), and portable multimedia players (PMPs)) and portable communication devices (e.g., smartphones and wearable devices).

In recent years, display devices have become thinner, lighter, or more multifunctional with the development of flat display panels, which may easily display images on large screens while reducing weight and volume.

As a result, the electrostatic sensitivity of circuit materials, such as system integrated circuit (IC) chips, has increased, making it necessary to prevent electrostatic discharge (ESD), a phenomenon in which an electrical charge is transferred between two objects.

SUMMARY

Provided is a display apparatus that may be capable of effectively discharging static electricity.

Provided is a display apparatus that may be capable of preventing light from leaking.

Provided is a display apparatus that may have improved aesthetics.

According to an aspect of the present disclosure, a display apparatus includes a display panel including a first border and a second border, and a decorative bezel that covers the first border. The display panel further includes: a first substrate, a second substrate including a first side, on which the first substrate is disposed, and a second side opposite to the first side, an electrode layer on the second side of the second substrate; a ground wire between the first substrate and the second substrate, the ground wire configured to connect to a ground; and a conductive silicon that is on the second border and electrically connects the electrode layer and the ground wire.

According to an aspect of the present disclosure, a display apparatus includes a display panel including: a first substrate; a second substrate on a front side of the first substrate; an electrode layer on a front side of the second substrate; a ground wire between the first substrate and the second substrate, wherein a portion of the ground wire is exposed from the second substrate; and a conductive silicon that electrically connects the electrode layer and the portion of the ground wire.

Aspects of embodiments of the present disclosure are not limited to the aspects and aspects mentioned above, and other aspects not mentioned will be clearly understood by those skilled in the art from the description below.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Figure 1:
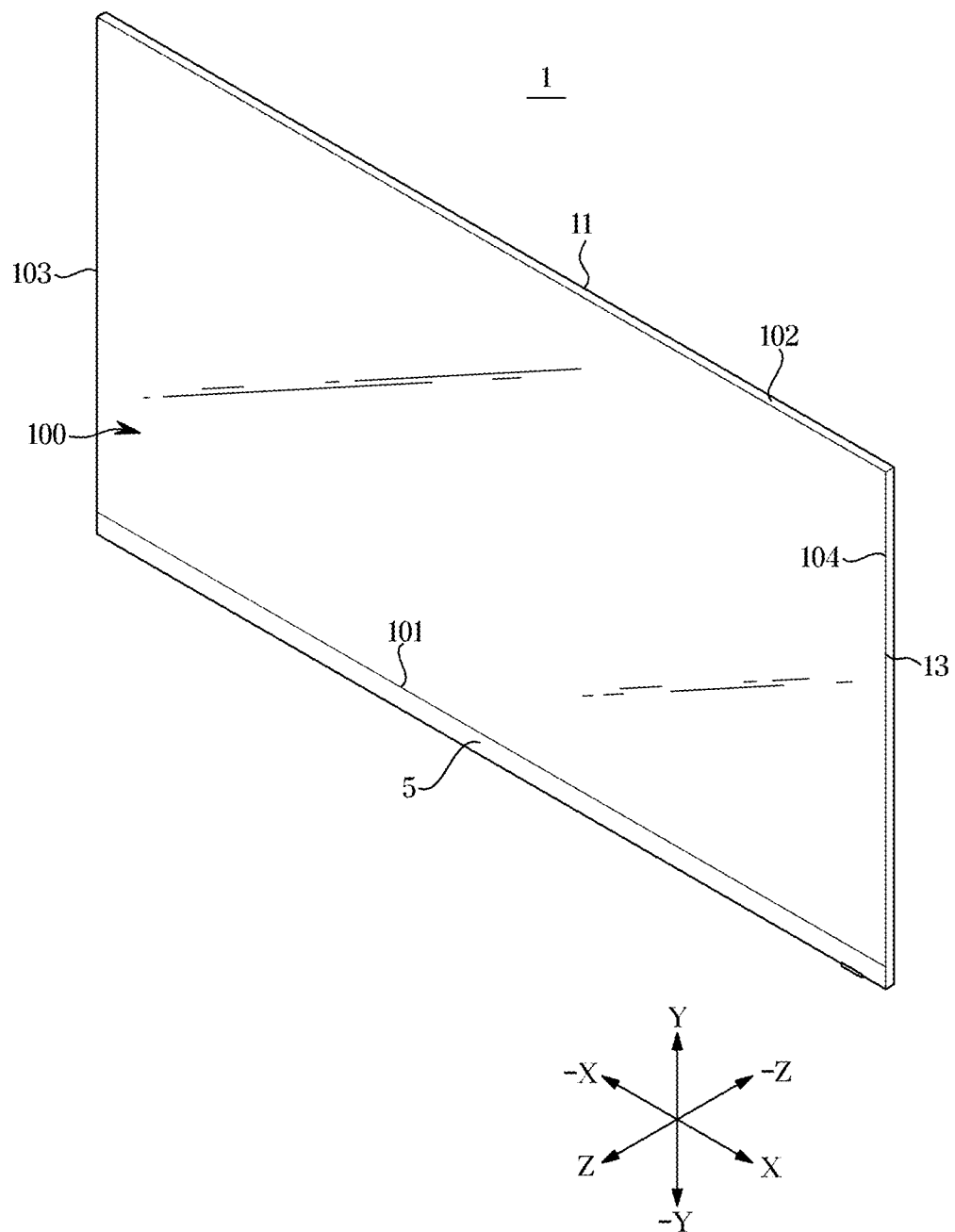
FIG. 1 is a perspective view illustrating a display apparatus according to one or more embodiments of the present disclosure.

Embodiments described in the present disclosure and shown in the drawings are merely examples of embodiments of the present disclosure and may be modified in various different ways at the time of filing of the present application.

In connection with the description of the drawings, similar reference numerals may be used for similar or related components.

Also, the terms used herein are used to describe embodiments and are not intended to limit and/or restrict the present disclosure. The singular forms "a," "an," and "the" are intended to include the plural forms as well, unless the context clearly indicates otherwise. In the present disclosure, the terms "including," "having," and the like are used to specify features, figures, steps, operations, elements, components, or combinations thereof, but do not preclude the presence or addition of one or more of the features, figures, steps, operations, elements, components, or combinations thereof.

It will be understood that, although the terms "first," "second," "primary," "secondary," etc., may be used herein to describe various elements, elements are not limited by these terms. These terms are only used to distinguish one element from another element. For example, without departing from the scope of the present disclosure, a first element may be termed as a second element, and a second element may be termed as a first element. The term of "and/or" includes a plurality of combinations of relevant items or any one item among a plurality of relevant items.

As used herein, the terms "front," "rear," "upper," "lower," "left," "right," and the like are defined with reference to the drawings and are not intended to limit the shape and location of each component.

Hereinafter, non-limiting example embodiments of the present disclosure will be described in detail with reference to the accompanying drawings.

Figure 2:
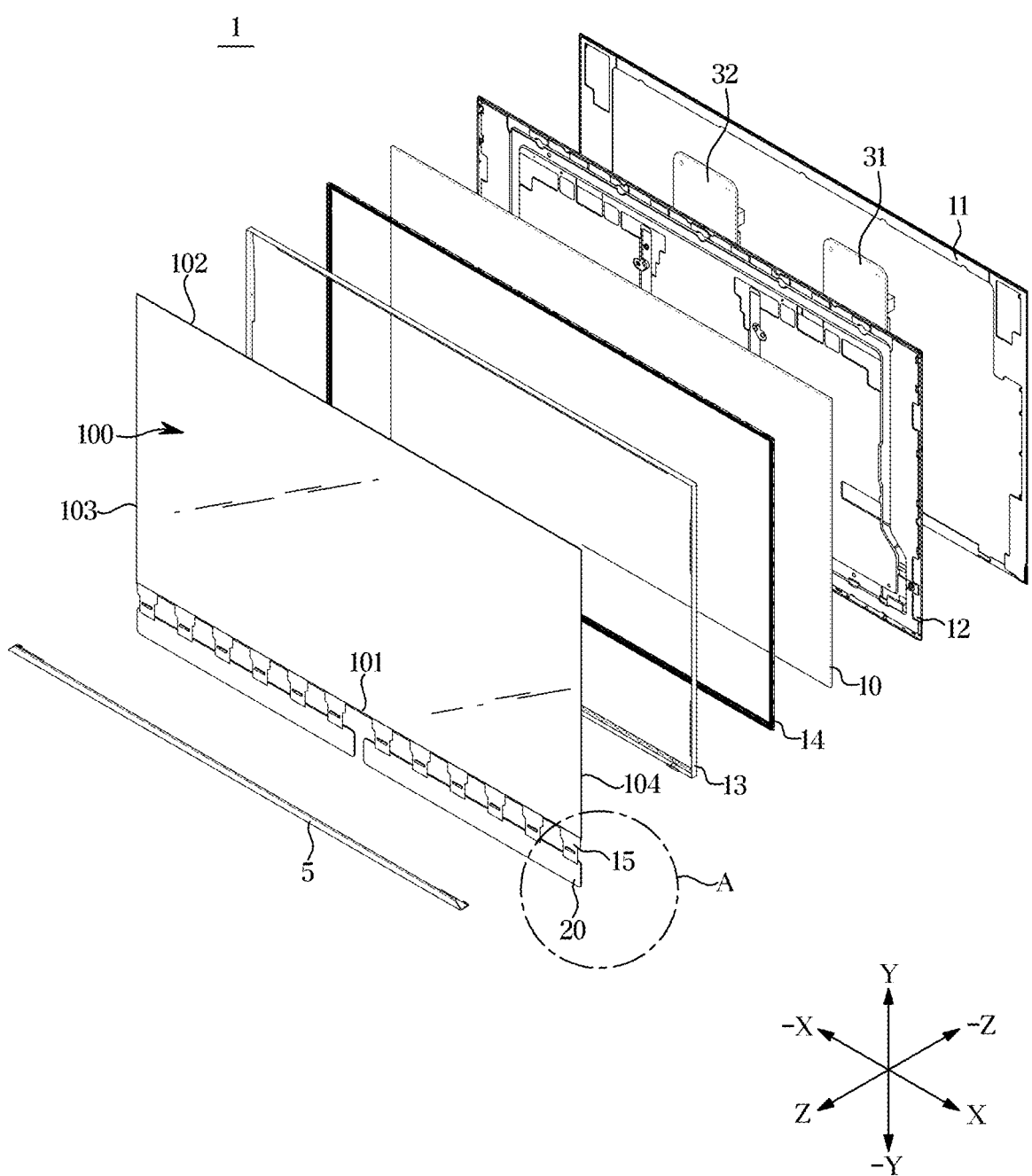
FIG. 2 is an exploded perspective view illustrating the display apparatus according to one or more embodiments of the present disclosure.

FIG. 1 is a perspective view illustrating a display apparatus according to one or more embodiments of the present disclosure. FIG. 2 is an exploded perspective view illustrating the display apparatus according to one or more embodiments of the present disclosure.

For ease of description, a direction in which a first border 101 of a display panel 100 extends may be referred to as a left-to-right direction (+X to −X), and a direction in which a third border 103 of the display panel 100 extends may be referred to as an up-and-down direction (+Y to −Y). A direction in which the display panel 100 of a display apparatus 1 faces may be referred to as a forward direction (+Z), and a rear cover 11 may be referred to as being disposed at a rear side of the display panel 100 in a rearward direction (−Z).

The display apparatus 1 may be an apparatus that processes an image signal received from an external source and visually displays the processed image. For example, the display apparatus 1 may be a television (TV), but is not limited thereto. For example, the display apparatus 1 may be implemented in various forms such as, a monitor, a portable multimedia device, a portable communication device, and the like. However, the form of the display apparatus 1 may not be limited as long as it is a device that visually displays images.

The display apparatus 1 may be a large format display (LFD) installed outdoors, such as on the roof of a building or at a bus stop. Here, the outdoors is not necessarily limited to outdoors, and the display apparatus 1 according to an embodiment may be installed in any place where a large number of people may enter and leave, even indoors, such as a subway station, a shopping mall, a movie theater, a company, or a store.

The display apparatus 1 may receive content including video signals and audio signals from various content sources, and output video and audio corresponding to the video signals and audio signals. For example, the display apparatus 1 may receive content data through a broadcast reception antenna or a wired cable, receive content data from a content playback device, or receive content data from a content delivery server of a content provider.

The display apparatus 1 may be provided with components inside for the display apparatus 1 to display images or perform various functions.

The display apparatus 1 may be configured to display a screen. In particular, the display apparatus 1 may include a display panel 100 that displays an image on a front side. The display panel 100 may also be referred to as a liquid crystal panel.

The display panel 100 may display an image using liquid crystals that exhibit optical properties in response to changes in voltage and temperature. The display panel 100 may be disposed on a front side of a backlight unit (BLU) 10 to block or transmit light output from the BLU 10.

The display panel 100 may include different types of panels. For example, the display panel 100 may be an in plane switching (IPS) mode panel. However, embodiments of the present disclosure are not limited thereto, and the display panel 100 may be a twist nematic (TN) panel or a vertical alignment (VA) panel.

The display panel 100 may include a first border 101 and a second border 102 disposed on an opposite side of the first border 101. The first border 101 and/or the second border 102 may be a long side of the display panel 100. The first border 101 and/or the second border 102 may extend along the left-to-right direction (+X to −X).

The first border 101 may be disposed on a lower side of the display panel 100. The second border 102 may be disposed on an upper side of the display panel 100.

The display panel 100 may include a third border 103 and a fourth border 104 disposed on an opposite side of the third border 103. The third border 103 and/or the fourth border 104 may be a short side of the display panel 100. The third border 103 and/or the fourth border 104 may extend along the up-and-down direction (+Y to −Y).

The third border 103 may be disposed on a left side of the display panel 100. The fourth border 104 may be disposed on a right side of the display panel 100.

The third border 103 may be arranged to be perpendicular to the first border 101. The third border 103 may be arranged to connect the first border 101 and the second border 102. The third border 103 may be disposed between the first border 101 and the second border 102.

The display apparatus 1 may include a decorative bezel 5 that covers the display panel 100. The decorative bezel 5 may be arranged to support the display panel 100. The decorative bezel 5 may cover one side of the display panel 100. The decorative bezel 5 may be coupled to the display panel 100 such that the display panel 100 is secured.

The decorative bezel 5 may be arranged to cover the first border 101 of the display panel 100. The decorative bezel 5 may extend along the first border 101 of the display panel 100. The decorative bezel 5 may be arranged to cover the first border 101 of the display panel 100. The decorative bezel 5 may be arranged to cover a lower portion of the display panel 100.

The decorative bezel 5 may be formed of a non-conductive material. For example, the decorative bezel 5 may include a plastic resin or the like. However, embodiments of the present disclosure are not limited thereto.

The first border 101 of the display panel 100 may be covered by the decorative bezel 5. The second border 102, the third border 103, and/or the fourth border 104 of the display panel 100 may not be covered by the decorative bezel 5.

Since the second border 102, the third border 103, and the fourth border 104 of the display panel 100 do not include any other structure, such as the decorative bezel 5, the display area of the display panel 100 may be wider. Furthermore, the aesthetics of the display apparatus 1 may be improved.

The display apparatus 1 may include a printed circuit board (PCB) 20 that transmits information to the display panel 100. The PCB 20 may be disposed on the lower side of the display panel 100. On the lower side of the display panel 100, a chip-on-film (COF) 15 that electrically connects the PCB 20 and the display panel 100 may be disposed.

The COF 15 may extend from the lower side of the display panel 100 to connect with the PCB. The chip-on film 15 may be bent at the lower side of the display panel 100 to extend to a rear side of a top chassis 13. The PCB 20 may be disposed on the rear side of the top chassis 13.

The COF 15 may include a film printed circuit board formed in the shape of a film and a semiconductor chip mounted on the film printed circuit board. The COF 15 may have one end connected to a lower end side of the display panel 100 and another end connected to the PCB 20, so that an image signal may be transmitted from the PCB 20 to the display panel 100.

The display apparatus 1 may include the BLU 10 configured to emit light. The BLU 10 may include a point light source emitting white light. The BLU 10 may refract, reflect, and scatter light to convert the light emitted from the point light source into a uniform surface light. In such a way, the BLU 10 may emit uniform surface light toward the front by refracting, reflecting, and scattering the light emitted from the point light source.

The display apparatus 1 may include a power assembly 31 that supplies power to the BLU 10 and the display panel 100, and a control assembly 32 that controls an operation of the display panel 100.

The display apparatus 1 may include the top chassis 13, a middle mold 14, and a bottom chassis 12 that receive and support the display panel 100 and the BLU 10. The top chassis 13 may be arranged to support the display panel 100. The display panel 100 may be attached to the top chassis 13. The BLU 10 may be installed in the bottom chassis 12. The bottom chassis 12 may be arranged to dissipate heat generated by the BLU 10 to the outside. The bottom chassis 12 may be formed of various metal materials (e.g., aluminum and stainless use steel (SUS)) or plastic materials (e.g., acrylonitrile butadiene styrene (ABS)). The middle mold 14 may be coupled to be secured to the bottom chassis 12.

Figure 3:
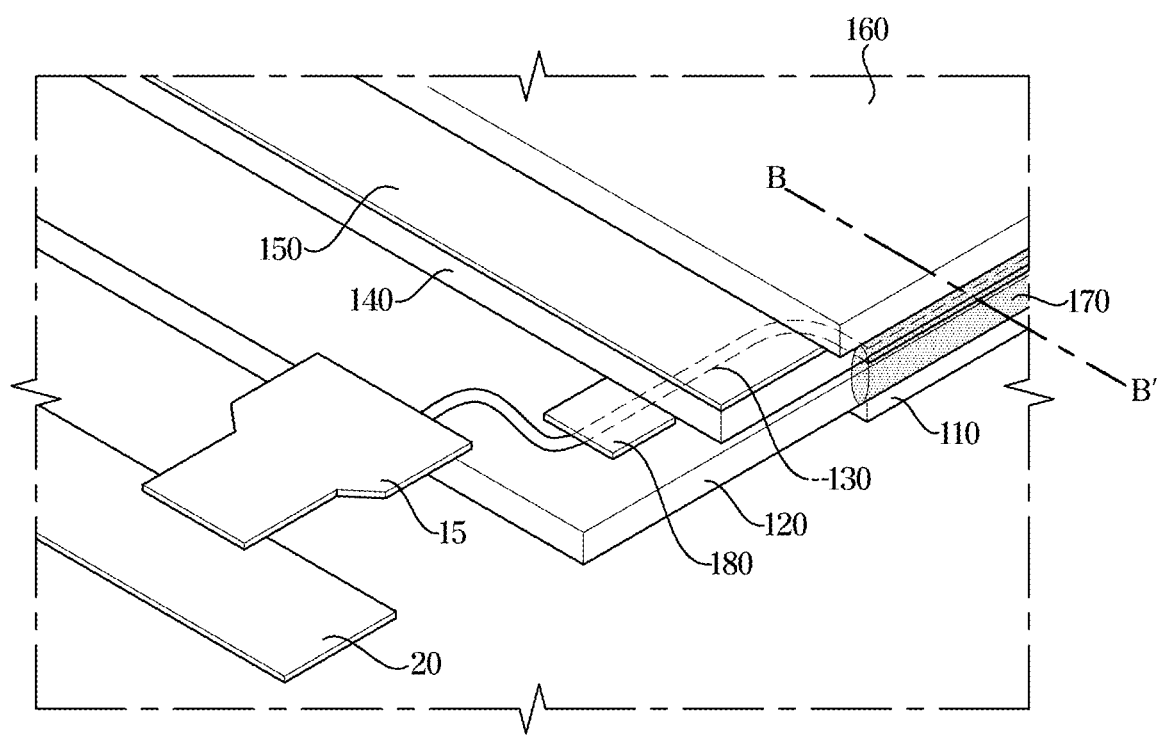
FIG. 3 is an enlarged perspective view of a portion A of a display panel shown in FIG. 2.
Figure 3:
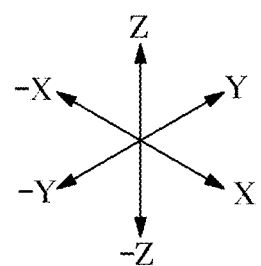
Figure 4:
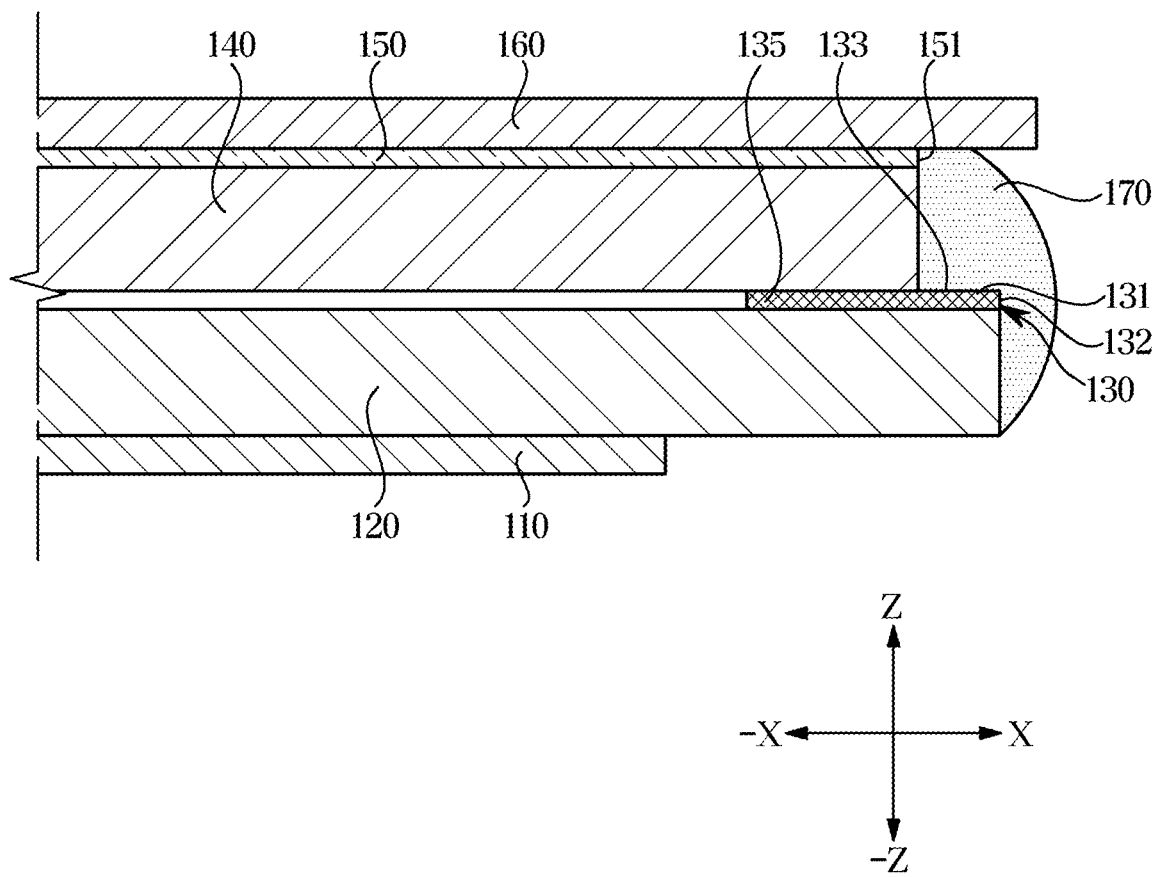
FIG. 4 is an enlarged cross-sectional view of the display panel shown in FIG. 3 taken along line B-B'.

FIG. 3 is an enlarged perspective view of portion A of the display panel shown in FIG. 2. FIG. 4 is an enlarged cross-sectional view of the display panel shown in FIG. 3 taken along line B-B'.

The display panel 100 may include substrates (e.g., a first substrate 120 and a second substrate 140). The substrates may be made of glass or a transparent plastic material. The substrates may be arranged in the form of a plate.

The substrates may include a first substrate 120. The first substrate 120 may be a thin film transistor (TFT) substrate. The first substrate 120 may include a plurality of TFTs arranged in a matrix form.

The substrates may include a second substrate 140. The second substrate 140 may be a color filter (CF) substrate. The second substrate 140 may correspond to the first substrate 120. A liquid crystal may be injected between the first substrate 120 and the second substrate 140.

The second substrate 140 may be disposed on a front side of the first substrate 120. The first substrate 120 may be disposed on a first side of the second substrate 140. The first side of the second substrate 140 may refer to the front.

The display panel 100 may include polarizers (e.g., a first polarizer 110 and a second polarizer 160). The polarizers may include a first polarizer 110 and a second polarizer 160. The first polarizer 110 may be disposed on a rear side of the first substrate 120. The second polarizer 160 may be disposed on a front side of the second substrate 140. The first polarizer 110 may be disposed on a first side of the second substrate 140. The second substrate 140 may be disposed on a second side of the second substrate 140. The second side of the second substrate 140 may refer to the rear.

The polarizers (e.g., the first polarizer 110 and the second polarizer 160) may be arranged such that light transmitting through the display panel 100 is cross-polarized. The direction of polarization of the first polarizer 110 and the second polarizer 160 may be arranged to be perpendicular to each other.

The display panel 100 may include an electrode layer 150. The electrode layer 150 may be an indium tin oxide (ITO) layer. The electrode layer 150 may be disposed on the front side of the second substrate 140. The electrode layer 150 may be disposed on the second side of the second substrate 140. The electrode layer 150 may be disposed between the second substrate 140 and the second polarizer 160.

The electrode layer 150 may be provided as a transparent electrode. The electrode layer 150 may be arranged to have a high conductivity. The electrode layer 150 may be arranged to discharge static electricity generated in the display panel 100 by inducing the static electricity into the electrode layer 150.

The electrode layer 150 may be deposited on the entire surface of the second substrate 140. The electrode layer 150 may be arranged to cover the entire surface of the second substrate 140.

The display panel 100 may include a ground wire 130. The ground wire 130 may be disposed between the first substrate 120 and the second substrate 140. The ground wire 130 may be connected to a ground pad 180. The ground wire 130 may be connected to the ground. The ground wire 130 may be arranged to ground static electricity generated in the display panel 100 to the ground.

The ground wire 130 may be arranged along the perimeter of the display panel 100. The ground wire 130 may be arranged to extend along the second border 102, the third border 103, and the fourth border 104.

The second substrate 140 may be formed smaller than the first substrate 120. The second substrate 140 may be disposed on an inner side the first substrate 120.

Because the second substrate 140 is formed to be smaller than the first substrate 120, at least a portion of the ground wire 130 may be exposed. The ground wire 130 may include an exposed portion 131 arranged to be exposed to the outside. The exposed portion 131 may be a region of the ground wire 130 that is not covered by the second substrate 140. The exposed portion 131 may be disposed on an outer side of a cover portion 135.

The ground wire 130 may include the cover portion 135 covered by the second substrate 140. The cover portion 135 may be a region of the ground wire 130 that is covered by the second substrate 140. The cover portion 135 may be disposed on an inner side of the exposed portion 131.

The exposed portion 131 may include a ground wire border 132 forming a side surface of the ground wire 130. The ground wire border 132 may be arranged to correspond to an edge of the first substrate 120. The ground wire border 132 may be arranged on the same plane as the edge of the first substrate 120.

The exposed portion 131 may include a ground wire front surface 133 forming a front surface of the ground wire 130. The ground wire front surface 133 may be a region of the ground wire 130 that is disposed to face forward. The ground wire front surface 133 may be arranged to face in a direction (Z) towards the second substrate 140. The ground wire front surface 133 may be disposed on an inner side of the ground wire border 132. The ground wire front surface 133 may be connected to the cover portion 135.

The display panel 100 may include a conductive silicon 170. The conductive silicon 170 may be provided to discharge static electricity generated in the display panel 100. The conductive silicon 170 may be arranged to electrically connect the electrode layer 150 and the ground wire 130. The conductive silicon 170 may be arranged to allow static electricity induced by the electrode layer 150 to move to the ground wire 130 and discharge through the bottom chassis 12. The conductive silicon 170 may be arranged such that static electricity is grounded to the ground.

The conductive silicon 170 may be formed from a conductive material. The conductive silicon 170 may be formed by adding a material, such as carbon, to silicon. However, embodiments of the present disclosure are not limited thereto.

The conductive silicon 170 may be disposed to contact the electrode layer 150. The conductive silicon 170 may be disposed to contact an electrode layer border 151.

The conductive silicon 170 may be disposed to contact the ground wire 130. The conductive silicon 170 may be disposed to contact the exposed portion 131 of the ground wire 130. The conductive silicon 170 may be disposed to contact the ground wire border 132 of the exposed portion 131. The conductive silicon 170 may be disposed to contact the ground wire front surface 133 of the exposed portion 131.

The conductive silicon 170 may be arranged to cover the first substrate 120 and/or the ground wire 130 and/or the second substrate 140 and/or the electrode layer 150. The conductive silicon 170 may be disposed between the first polarizer 110 and the second polarizer 160.

A size of the second polarizer 160 may be larger than a size of the first substrate 120 and/or the second substrate 140 and/or the first polarizer 110. The second polarizer 160 may be arranged to protrude from the first substrate 120 and/or the second substrate 140 and/or the first polarizer 110. When the conductive silicon 170 is applied between the first polarizer 110 and the second polarizer 160, the second polarizer 160 may protrude outwardly, thereby allowing the second polarizer 160 to guide the area to which the conductive silicon is applied.

The size of the first polarizer 110 may be smaller than a size of the first substrate 120 and/or the second substrate 140 and/or the first polarizer 110. A double-sided tape for coupling the display panel 100 to the middle mold 14 may be attached to an outer side of the first polarizer 110.

Figure 5:
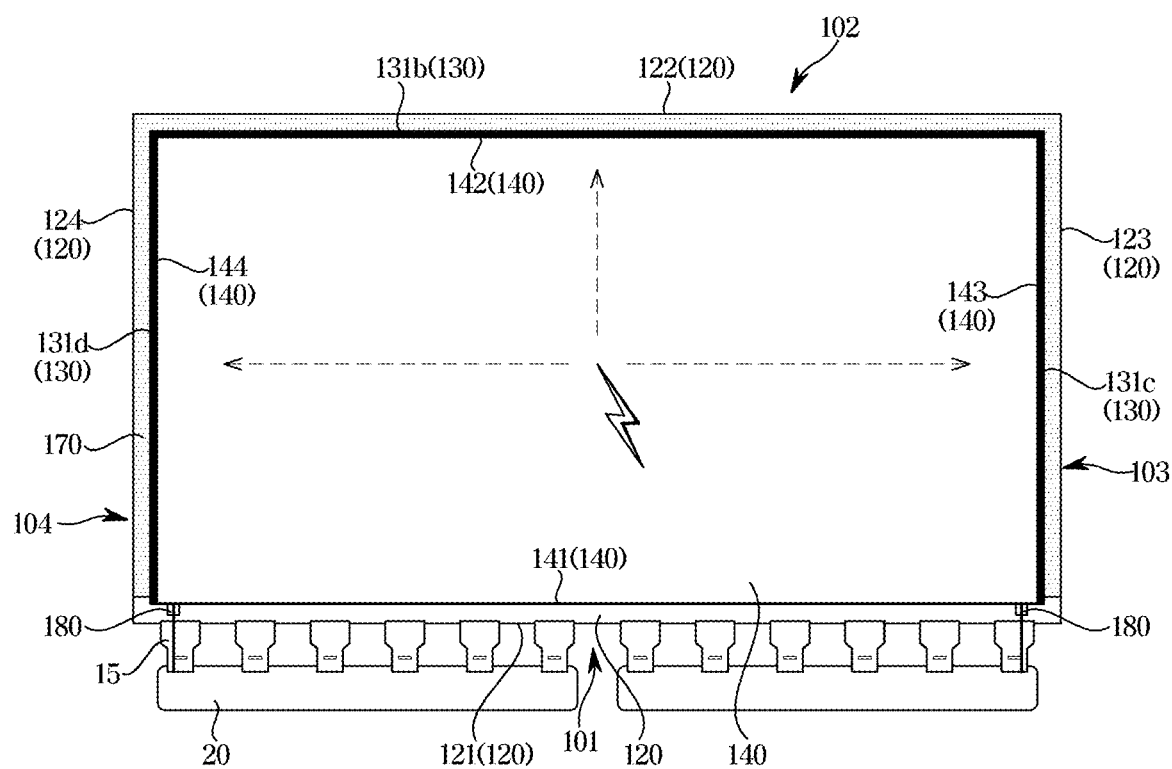
FIG. 5 is a top view of the display panel according to one or more embodiments of the present disclosure.

FIG. 5 is a top view of the display panel according to an embodiment of the present disclosure.

For ease of description, a configuration of the second polarizer is omitted from FIG. 5.

The first substrate 120 may include a first side 121 corresponding to the first border 101 of the display panel 100, a second side 122 disposed on an opposite side of the first side 121, a third side 123 orthogonal to the first side 121, and a fourth side 124 disposed on an opposite side of the third side 123.

The second substrate 140 may include a first side 141, a second side 142, a third side 143, and a fourth side 144 arranged to correspond to the first side 121, the second side 122, the third side 123, and the fourth side 124, respectively, of the first substrate 120.

The first border 101 of the display panel 100 may include the first side 121 of the first substrate 120 and/or the first side 141 of the second substrate 140. The second border 102 of the display panel 100 may include the second side 122 of the first substrate 120 and/or the second side 142 of the second substrate 140. The third border 103 of the display panel 100 may include the third side 123 of the first substrate 120 and/or the third side 143 of the second substrate 140. The fourth border 104 of the display panel 100 may include the fourth side 124 of the first substrate 120 and/or the fourth side 144 of the second substrate 140.

The ground wire 130 may extend along the perimeter of the display panel 100. The ground wire 130 may extend along the second border 102, the third border 103, and the fourth border 104 of the display panel 100. The ground wire 130 may extend along the second side 122, the third side 123, and the fourth side 124 of the first substrate 120.

The second side 142 of the second substrate 140 may be disposed more inward than the second side 122 of the first substrate 120. The third side 143 of the second substrate 140 may be disposed more inward than the third side 123 of the first substrate 120. The fourth side 144 of the second substrate 140 may be disposed more inward than the fourth side 124 of the first substrate 120.

The exposed portion 131 of the ground wire 130 may extend along the second border 102, the third border 103, and the fourth border 104 of the display panel 100. The exposed portion 131 of the ground wire 130 may extend along the second side 122, the third side 123, and the fourth side 124 of the first substrate 120.

The exposed portion 131 may include a first exposed portion 131b disposed along the second side 122 of the first substrate 120, a second exposed portion 131c disposed along the third side 123 of the first substrate 120, and a third exposed portion 131d disposed along the fourth side 124 of the first substrate 120.

The first exposed portion 131b may be disposed between the second side 122 of the first substrate 120 and the second side 142 of the second substrate 140. The first exposed portion 131b may be disposed on an inner side of the second side 122 of the first substrate 120. The first exposed portion 131b may be disposed on an outer side of the second side 142 of the second substrate 140.

The second exposed portion 131c may be disposed between the third side 123 of the first substrate 120 and the third side 143 of the second substrate 140. The second exposed portion 131c may be disposed on an inner side of the third side 123 of the first substrate 120. The second exposed portion 131c may be disposed on an outer side of the third side 143 of the second substrate 140.

The third exposed portion 131d may be disposed between the fourth side 124 of the first substrate 120 and the fourth side 144 of the second substrate 140. The third exposed portion 131d may be disposed on an inner side of the fourth side 124 of the first substrate 120. The third exposed portion 131d may be disposed on an outer side of the fourth side 144 of the second substrate 140.

Because the second substrate 140 is formed smaller than the first substrate 120, the area where the ground wire 130 is exposed may be increased. As the exposed portion 131 of the ground wire 130 becomes wider, static electricity may be effectively discharged.

The conductive silicon 170 may extend along the perimeter of the display panel 100. The conductive silicon 170 may extend along the second border 102, the third border 103, and the fourth border 104 of the display panel 100. The conductive silicon 170 may extend along the ground wire 130. The conductive silicon 170 may extend along a direction in which the exposed portion 131 of the ground wire 130 extends.

As the contact area between the conductive silicon 170 and the ground wire 130 is increased, static electricity may be effectively discharged. As the contact area between the conductive silicon 170 and the exposed portion 131 of the ground wire 130 is increased, static electricity may be effectively discharged.

In the event that static electricity is generated in the display panel 100, static electricity may be induced to the second border 102, the third border 103, and the fourth border 104, as indicated by the dashed arrows in FIG. 5. In other words, the paths by which static electricity is discharged are diversified, so that static electricity may be effectively discharged.

The conductive silicon 170 may not be disposed on the first border 101. Accordingly, it may be prevented from interfering with the decorative bezel 5 being coupled to the first border 101, thereby facilitating coupling of the decorative bezel 5 and the display panel 100. Furthermore, as the coupling of the decorative bezel 5 and the display panel 100 becomes stronger, light leakage to the outside may be prevented.

The conductive silicon 170 may cover the second border 102, the third border 103, and the fourth border 104 of the display panel 100. The conductive silicon 170 may cover areas of the display panel 100 that are not covered by the decorative bezel 5. The conductive silicon 170 may prevent light from leaking out of the second border 102, the third border 103, and the fourth border 104 of the display panel 100. The conductive silicon 170 may be arranged to protect internal components of the display panel 100 from impact.

The conductive silicon 170 may be provided in a color in the indigo or black range. The conductive silicon 170 may be provided in a dark color to cover the borders of the display panel 100. However, embodiments of the present disclosure are not limited thereto.

The display apparatus 1 according to one or more embodiments of the present disclosure may include the display panel 100 including the first border 101 and the second border 102; the decorative bezel 5 arranged to cover the first border 101; wherein the display panel 100 may include the first substrate 120; the second substrate 140 having the first side on which the first substrate 120 is disposed and the second side opposite to the first side; the electrode layer 150 disposed on the second side of the second substrate 140; the ground wire 130 disposed between the first substrate 120 and the second substrate 140 for connection to the ground; and the conductive silicon 170 arranged to electrically connect the electrode layer 150 and the ground wire 130 and disposed on the second border 102. According to embodiments of the present disclosure, the conductive silicon 170 for discharging the display apparatus 1 may be prevented from interfering with the decorative bezel 5, thereby facilitating the coupling of the decorative bezel 5 and the display panel 100. In addition, as the coupling of the decorative bezel 5 and the display panel 100 becomes stronger, light leakage to the outside may be prevented.

The display panel 100 may further include the third border 103, orthogonal to the first border 101, and the fourth border 104 disposed on an opposite side of the third border 103, and the conductive silicon 170 may be disposed on the third border 103 and the fourth border 104. The ground wire 130 may extend along the second border 102, the third border 103, and the fourth border 104, and the conductive silicon 170 may extend along the ground wire 130. According to embodiments of the present disclosure, the conductive silicon 170 may be disposed along the borders except for the first border 101, thereby preventing interference with the decorative bezel 5. In addition, the discharge effect may be improved by increasing the contact area between the conductive silicon 170 and the ground wire 130.

The second substrate 140 may be formed to be smaller than the first substrate 120 to allow at least a portion of the ground wire 130 to be exposed. According to embodiments of the present disclosure, the discharge effect may be improved by increasing the area in which the ground wire 130 is exposed.

The ground wire 130 may include the cover portion 135, covered by the second substrate 140, and the exposed portion 131 disposed on the outer side of the cover portion 135. According to embodiments of the present disclosure, the area of the exposed portion 131 of the ground wire 130 may be expanded by disposing the second substrate 140 on the inner side of the first substrate 120.

The exposed portion 131 may extend along the second border 102, the third border 103, and the fourth border 104. The conductive silicon 170 may be arranged to be in contact with the exposed portion 131. According to embodiments of the present disclosure, the discharge effect may be improved by increasing the contact area between the exposed portion 131 and the conductive silicon 170.

The exposed portion 131 may include the ground wire border 132 forming the side surface of the ground wire 130, and the conductive silicon 170 may be arranged to be in contact with the ground wire border 132. According to embodiments of the present disclosure, the conductive silicon 170 may cover the ground wire border 132 to improve the discharge effect and protect the ground wire 130.

The exposed portion 131 may include the ground wire front surface 133 disposed to face the second substrate 140, and the conductive silicon 170 may be arranged to be in contact with the ground wire front surface 133. According to embodiments of the present disclosure, the conductive silicon 170 may cover the ground wire front surface 133 to improve the discharge effect and protect the ground wire 130.

The electrode layer 150 may include the electrode layer border 151 forming the side surface of the electrode layer 150, and the conductive silicon 170 may be in contact with the electrode layer border 151. According to embodiments of the present disclosure, the conductive silicon 170 may cover the electrode layer border 151 to improve the discharge effect and protect the electrode layer 150.

The display panel 100 may include the first polarizer 110 disposed on the first side of the second substrate 140; and the second polarizer 160 disposed on the second side of the second substrate 140, wherein the conductive silicon 170 may be disposed between the first polarizer 110 and the second polarizer 160. According to embodiments of the present disclosure, the conductive silicon 170 may cover and protect components between the first polarizer 110 and the second polarizer 160.

A size of the second polarizer 160 may be formed to be larger than a size of the first substrate 120. The size of the second polarizer 160 may be formed to be larger than the size of the second substrate 140. According to embodiments of the present disclosure, the second polarizer 160 may guide the area where the conductive silicon 170 is applied because the second polarizer 160 protrudes outwardly.

The size of the first polarizer 110 may be formed to be smaller than the size of the first substrate 120. The size of the first polarizer 110 may be formed to be smaller than the size of the second polarizer 160. According to embodiments of the present disclosure, a double-sided tape for coupling the display panel 100 to the middle mold 14 may be attached to the outer side of the first polarizer 110.

The display apparatus 1 according to one or more embodiments of the present disclosure may include the first substrate 120; the second substrate 140 disposed on the front side of the first substrate 120; the electrode layer 150 disposed on the front side of the second substrate 140; the ground wire 130 disposed between the first substrate 120 and the second substrate 140 and arranged to expose at least a portion of the ground wire 130 to the outer side of the second substrate 140; and the conductive silicon 170 arranged to electrically connect the electrode layer 150 and the portion of the ground wire 130. According to embodiments of the present disclosure, the discharge effect may be improved by increasing the contact area between the conductive silicon 170 and the ground wire 130.

The ground wire 130 may include the cover portion 135 covered by the second substrate 140; and the exposed portion 131 disposed on the outer side of the cover portion 135. According to embodiments of the present disclosure, the area of the exposed portion 131 of the ground wire 130 may be expanded by disposing the second substrate 140 on the inner side of the first substrate 120.

The conductive silicon 170 may be arranged to be in contact with the exposed portion 131. According to embodiments of the present disclosure, the discharge effect may be improved by increasing the contact area between the conductive silicon 170 and the exposed portion 131.

The display apparatus 1 may include the first polarizer 110 disposed on the rear side of the first substrate 120; the second polarizer 160 disposed on the front side of the second substrate 140, wherein the conductive silicon 170 may be disposed between the first polarizer 110 and the second polarizer 160. According to embodiments of the present disclosure, the conductive silicon 170 may cover and protect components between the first polarizer 110 and the second polarizer 160.

The second substrate 140 may be formed to be smaller than the first substrate 120 to allow the portion of the ground wire 130 to be exposed. According to embodiments of the present disclosure, the discharge effect may be improved by increasing the area in which the ground wire 130 is exposed.

According to embodiments of the present disclosure, static electricity in the display apparatus may be effectively discharged.

According to embodiments of the present disclosure, light leakage from the display apparatus may be prevented.

According to embodiments of the present disclosure, the aesthetics of the display apparatus may be improved.

The effects obtained from embodiments of present disclosure are not limited to those mentioned above, and other effects not mentioned will be apparent to a person skilled in the art to which the present disclosure belongs.

Although certain non-limiting example embodiments are illustrated and described above, embodiments of the present disclosure are not limited to the example embodiments. For example, various applications may be performed by those skilled in the art without deviating from the spirit and scope of the present disclosure, and such applications should be understood to be a part of the present disclosure.

What is claimed is:

1. A display apparatus comprising:
    a display panel comprising a first border and a second border; and
    a decorative bezel that covers the first border,
    wherein the display panel further comprises:
        a first substrate,
        a second substrate comprising a first side, on which the first substrate is disposed, and a second side opposite to the first side,
        an electrode layer on the second side of the second substrate;
        a ground wire between the first substrate and the second substrate, the ground wire configured to connect to a ground; and
        a conductive silicon that is on the second border and electrically connects the electrode layer and the ground wire,
    wherein the second substrate is smaller than the first substrate such that a portion of the ground wire is exposed from the second substrate,
    wherein the ground wire comprises:
        a cover portion covered by the second substrate, and
        an exposed portion on an outer side of the cover portion, the exposed portion being the portion of the ground wire that is exposed from the second substrate, and
    wherein the conductive silicon is in contact with the exposed portion.

2. The display apparatus of claim 1, wherein
    the display panel further comprises a third border, orthogonal to the first border, and a fourth border that is on an opposite side of the third border, and
    the conductive silicon is on the third border and the fourth border.

3. The display apparatus of claim 2, wherein the ground wire extends along the second border, the third border, and the fourth border, and
    the conductive silicon extends along the ground wire.

4. The display apparatus of claim 2, wherein the exposed portion extends along the second border, the third border, and the fourth border.

5. The display apparatus of claim 1, wherein the exposed portion comprises a ground wire border that is a side surface of the ground wire, and
    the conductive silicon contacts the ground wire border.

6. The display apparatus of claim 1, wherein the exposed portion comprises a ground wire front surface that faces in a direction towards the second substrate, and
    the conductive silicon contacts the ground wire front surface.

7. The display apparatus of claim 1, wherein the electrode layer comprises an electrode layer border that is a side surface of the electrode layer, and
    the conductive silicon contacts the electrode layer border.

8. The display apparatus of claim 1, wherein the display panel further comprises:
    a first polarizer on the first side of the second substrate; and
    a second polarizer on the second side of the second substrate, and
    wherein the conductive silicon is between the first polarizer and the second polarizer.

9. The display apparatus of claim 8, wherein a size of the second polarizer is larger than a size of the first substrate.

10. The display apparatus of claim 8, wherein a size of the second polarizer is larger than a size of the second substrate.

11. The display apparatus of claim 8, wherein a size of the first polarizer is smaller than a size of the first substrate.

12. The display apparatus of claim 8, wherein a size of the first polarizer is smaller than a size of the second polarizer.

13. A display apparatus comprising:
    a display panel comprising:
        a first substrate;
        a second substrate on a front side of the first substrate;
        an electrode layer on a front side of the second substrate;
        a ground wire between the first substrate and the second substrate, wherein a portion of the ground wire is exposed from the second substrate; and
        a conductive silicon that electrically connects the electrode layer and the portion of the ground wire,
    wherein the ground wire comprises a cover portion covered by the second substrate, and an exposed portion on an outer side of the cover portion, the exposed portion being the portion of the ground wire exposed from the second substrate, and
    wherein the conductive silicon contacts the exposed portion.

14. The display apparatus of claim 13, wherein the display panel further comprises:
    a first polarizer on a rear side of the first substrate;
    a second polarizer on the front side of the second substrate, and wherein the conductive silicon is between the first polarizer and the second polarizer.

15. The display apparatus of claim 13, wherein the second substrate is smaller than the first substrate such that the portion of the ground wire is exposed from the second substrate.

* * * * *